United States Patent
Wittorf et al.

(10) Patent No.: US 10,668,872 B2
(45) Date of Patent: Jun. 2, 2020

(54) DOOR EDGE PROTECTOR

(71) Applicant: GM Global Technology Operations LLC, Detroit, MI (US)

(72) Inventors: Marten Wittorf, Rüsselsheim (DE); Uwe Schmitz, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 83 days.

(21) Appl. No.: 15/785,740

(22) Filed: Oct. 17, 2017

(65) Prior Publication Data

US 2019/0111861 A1 Apr. 18, 2019

(51) Int. Cl.
*B60R 13/04* (2006.01)

(52) U.S. Cl.
CPC .................. *B60R 13/043* (2013.01)

(58) Field of Classification Search
CPC .................................... B60R 13/043
USPC .................................. 49/460, 462
See application file for complete search history.

(56) References Cited

U.S. PATENT DOCUMENTS

| 3,380,193 | A | * | 4/1968 | Hill | ....................... B60R 13/043 293/1 |
| 3,513,595 | A | | 5/1970 | Mills | |
| 4,490,942 | A | * | 1/1985 | Arnheim | .................. B60J 10/24 49/374 |

FOREIGN PATENT DOCUMENTS

| DE | 2628233 A1 | 1/1978 |
| DE | 3523391 A1 | 1/1987 |
| DE | 4439460 C1 | 12/1995 |
| DE | 102004026294 A1 | 12/2005 |
| DE | 102004059272 A1 | 6/2006 |
| DE | 202007007826 U1 | 9/2007 |
| DE | 102014016489 A1 * | 5/2016 ........... B60R 13/043 |

* cited by examiner

*Primary Examiner* — Gregory J Strimbu

(57) ABSTRACT

A door edge protector for an edge of a door of a motor vehicle includes a unitary extrusion having a push rod member having a proximal end coupled to a rear wall member by a coupling member. The unitary extrusion also includes a pull member coupled to the rear wall member and extending to an edge covering member. An adhesive attaches the unitary extrusion to an interior surface of the door of the motor vehicle. In a first position of the push rod member, the push rod member is not in contact with the pull member and the edge covering member extends around the edge of the door. In a second position of the push rod member, the push rod member is in contact with the pull member and compresses a portion of the pull member so as to retract the edge covering member.

18 Claims, 4 Drawing Sheets

DOOR EDGE PROTECTOR

INTRODUCTION

The present disclosure relates to door edge protectors for motor vehicle applications. Door edge protection devices for motor vehicle doors have edge protection bodies which are arranged inside the door body in the vicinity of the opening door edge and, when the door is opened, pivot around the door edge and surround the door edge, so that, when the door is opened further, the door edge is protected from bumps against adjacent vehicles or other obstacles such as trees, walls, and the like, thereby preventing damage both to the door edge protection-equipped vehicle, and to surrounding objects. Door edge protection devices are often formed of multiple mechanically-interacting parts designed to deploy an edge protection portion as the door opens. Furthermore, because vehicle door contours vary substantially between models and vehicle types, door edge protection devices are often optimized for a particular application.

Thus, while current door edge protection systems and door edge protectors achieve their intended purpose, there is a need for a new and improved door edge protectors that are robust, durable, and portable, and which may be produced at large scale at an optimal cost, and for a wide variety of applications.

SUMMARY

According to one aspect of the present disclosure a door edge protector for an edge of a door of a motor vehicle includes a unitary extrusion having a rear wall member coupled to a push rod member by a coupling member, the push rod member being separate and distinct from a pull member, the pull member coupled to the rear wall member and extending to an edge covering member. The door edge protector further includes an adhesive attaching the unitary extrusion to an interior surface of the door of the motor vehicle. The push rod member is not in contact with the pull member, and the edge covering member extends around the edge of the door in a first position, and wherein the push rod member is in contact with the pull member and compresses a portion of the pull member in a second position.

In another aspect of the present disclosure the rear wall member comprises a thickened area having increased rigidity relative to the push rod member, the coupling member, the pull member, and the edge covering member.

In yet another aspect of the present disclosure in the second position the edge covering member does not extend around the edge of the door.

In yet another aspect of the present disclosure the unitary extrusion comprises a flexible material.

In yet another aspect of the present disclosure the adhesive is an adhesive foil material.

In yet another aspect of the present disclosure the push rod member extends from the rear wall member inwardly from an interior surface of the door of the motor vehicle.

In yet another aspect of the present disclosure the pull member has a first effective length in the first position and a second effective length in the second position, and the second effective length is less than the first effective length.

In yet another aspect of the present disclosure in the second position, the pull member decreases a distance between the rear wall member and the edge covering member.

In yet another aspect of the present disclosure the pull member includes a first portion connected to a second portion.

In yet another aspect of the present disclosure the first portion is more flexible than the second portion.

In yet another aspect of the present disclosure a door edge protector for an edge of a door of a motor vehicle includes a unitary extrusion comprising a resilient material and having a rear wall member extending from a base portion, the rear wall member coupled to a push rod member by a coupling member, the push rod member being separate and distinct from a pull member, the pull member having a first portion coupled to the rear wall member and a contact portion, the pull member having a second portion extending from the contact portion to an edge covering member. The door edge protector further includes an adhesive attaching the unitary extrusion to an interior surface of the door of the motor vehicle. The push rod member is not in contact with the pull member, and the edge covering member extends around the edge of the door in a first position, and the push rod member is in contact with the pull member and compresses a portion of the pull member in a second position.

In yet another aspect of the present disclosure in the second position the push rod member contacts the pull member at the contact portion.

In yet another aspect of the present disclosure the resilient material includes at least one of a rubber, silicone, foam, or malleable plastic material.

In yet another aspect of the present disclosure the rear wall member is stiffer than both of the push rod member and the pull member.

In yet another aspect of the present disclosure the base portion further includes an extension, wherein the extension extends opposite the edge covering member relative to the rear wall member, and wherein the extension is adhered to the door of the motor vehicle by the adhesive.

In yet another aspect of the present disclosure the second portion of the pull member is stiffer than the first portion of the pull member.

In yet another aspect of the present disclosure the edge covering member further includes a flexible joint, wherein the flexible joint is extended in the first position, and wherein the flexible joint is bent at an angle in the second position.

In yet another aspect of the present disclosure in the second position, the push rod member at least partially compresses the contact portion, the contact portion flexes toward the rear wall member, the first portion of the pull member is compressed, and the compressed first portion of the pull member pulls the second portion of the pull member toward the rear wall member thereby retracting the edge covering member.

In yet another aspect of the present disclosure the adhesive is not applied along a section of the door edge protector from the flexible joint to the edge covering member In yet another aspect of the present disclosure a door edge protector for an edge of a door of a motor vehicle includes a unitary extrusion composed of a resilient material and having a rear wall member extending from a base portion. The rear wall member is coupled to a push rod member by a coupling member. The push rod member is separate and distinct from a pull member, the pull member having a first portion coupled to the rear wall member and a contact portion, the pull member having a second portion stiffer than the first portion, and extending from the contact portion to an edge covering member. The door edge protector further includes a flexible joint between the rear wall member and the edge covering member, and an adhesive attaching the unitary extrusion to an interior surface of the door of the motor vehicle, the adhesive not applied to the edge covering member. The push rod member is not in contact with the pull member, and the edge covering member extends around the edge of the door in a first position. In a second position the push rod member is in contact with the contact portion of the pull member and at least partially compresses the contact portion, the contact portion flexes toward the rear wall member, the first portion of the pull member is compressed, and the compressed first portion of the pull member pulls the second portion of the pull member toward the rear wall member thereby rotating the edge covering member at the flexible joint retracting the edge covering member.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
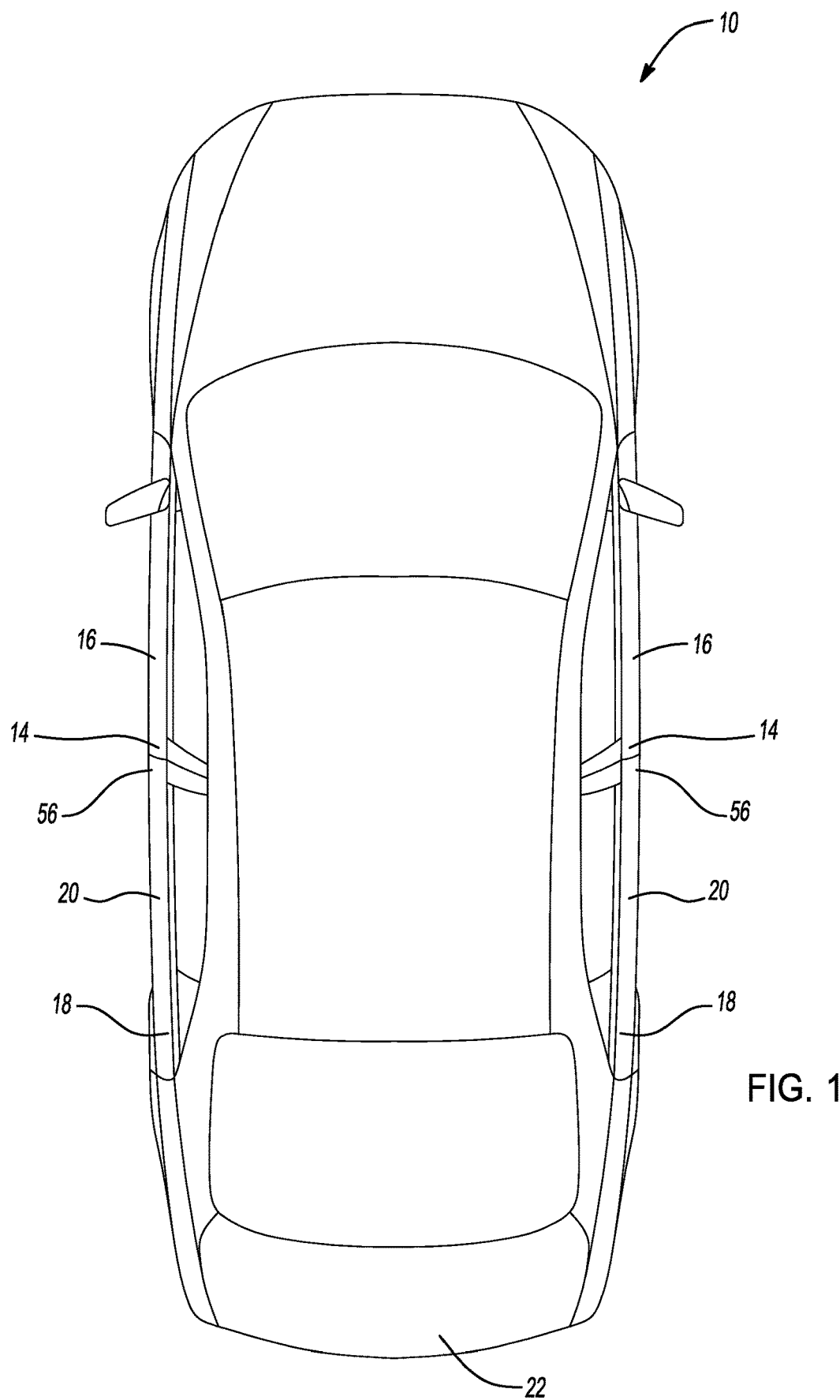
FIG. 1 is an environmental view of a door edge protector on a vehicle according to an aspect of the present disclosure.
Figure 2:
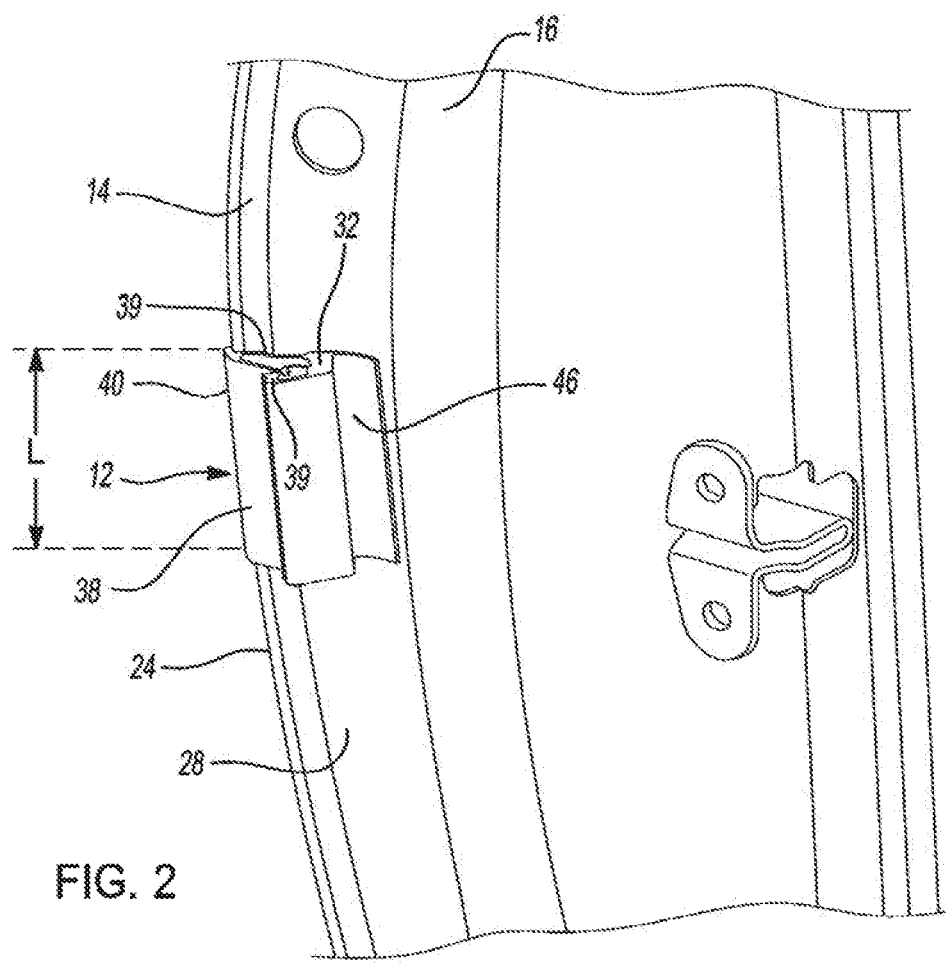
FIG. 2 is a perspective view of a door edge protector equipped to a door of a vehicle according to an aspect of the present disclosure.

The following description is merely exemplary in nature and is not intended to limit the present disclosure, application, or uses. Referring to FIGS. 1 and 2, a first example of a door edge protector for a motor vehicle 10 according to the present disclosure is shown and indicated generally by reference number 12. The motor vehicle 10 is illustrated as a passenger vehicle, however, the motor vehicle 10 may be any type of motor vehicle 10, including a truck, van, motor home, sport utility vehicle, or any other type of vehicle without departing from the scope of the present disclosure. The door edge protector 12 may be used in a variety of positions on the motor vehicle 10. In some examples, the door edge protector 12 is mounted at a trailing edge 14 of the front doors 16 of the motor vehicle 10. However, it should be understood that while the bulk of this disclosure will focus on door edge protectors 12 mounted to the trailing edges 14 of the front doors 16, the door edge protectors 12 may similarly be attached to other aspects of the motor vehicle 10. For example, the door edge protectors 12 may be mounted to trailing edges 18 of rear doors 20, to front edges of front and/or rear doors 16, 20 if the front and/or rear doors 16, 20 are so-called, "suicide doors", as well as to other portions of the motor vehicle 10, such as rear hatches (not shown), trunk lids 22, and the like without departing from the scope or intent of the present disclosure.

The door edge protector 12 is a single-material device formed of a resilient, deformable material. In several aspects, the resilient, deformable material of which the door edge protector 12 is composed is rubber, polyurethane, or other materials of the like having resilient, elastic properties. The resilient, elastic properties of the door edge protector 12 material are selected to allow the door edge protector 12 to be repetitively compressed and uncompressed, or otherwise deformed from a first position to a second position while maintaining desired structural characteristics. In other words, the resilient material of the door edge protector 12 is selected for longevity, successful door edge protection, and other such characteristics, as well as deformability as will be described further below.

In an aspect, the door edge protector 12 is an extrusion molded part having a predetermined longitudinal length "L". In one example, the longitudinal length "L" of the door edge protector 12 is optimized to extend along a portion of the trailing edge 14 of the front doors 16 of the motor vehicle 10 at an outer limit 24 of the trailing edge 14. In another example, a plurality of door edge protectors 12 are used in an application in which contours of the front doors 16 of the motor vehicle 10 have multiple outermost limits 24. In other words, if external contours of the front doors 16 include multiple concave and convex sections, the trailing edge 14 of the front doors 16 include multiple outermost limits 24 that may contact other vehicles or objects in proximity to the front doors 16 of the motor vehicle 10 when the front doors 16 are opened. Thus, because there is significant variation between the shapes of the front doors 16 of different types of motor vehicles 10, it should be understood that the longitudinal length "L" of the door edge protector 12, the placement position on the trailing edge 14 of the front doors 16, and the quantity of door edge protectors 12 on each front door 16 may vary without departing from the scope or intent of the present disclosure.

Figure 3:
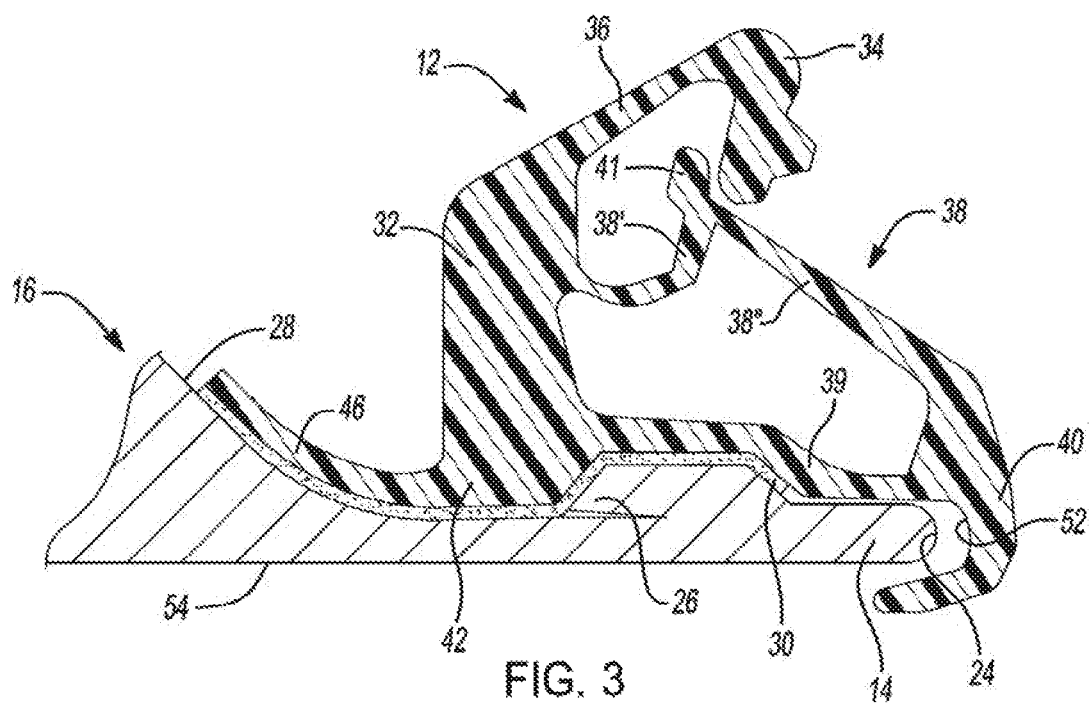
FIG. 3 is a cross sectional view of a door edge protector equipped to a door of a vehicle according to an aspect of the present disclosure.

Referring now to FIG. 3, and with continuing reference to FIGS. 1 and 2, in some aspects, the door edge protector 12 is mounted overtop a seam 26 at the trailing edge 14 of an interior surface 28 of the front door 16, thereby at least partially covering the seam 26. The door edge protector 12 is affixed to the interior surface 28 of the front door 16 by an adhesive 30. In some aspects, the adhesive 30 is an adhesive foil, a glue a double-sided tape, a sealant, a room temperature vulcanization (RTV) product, or other like chemically adhesive materials. Additionally, the adhesive 30 provides production and assembly advantages such as simplicity of assembly, low cost of manufacture, and the like. Moreover, the adhesive 30 allows the door edge protector 12 to be applied at any time after the front door 16 is produced. Thus, in several examples, the door edge protector 12 may be attached by a motor vehicle 10 manufacturer, by an auto body shop, by a motor vehicle 10 sales organization, or by an end customer. It should be appreciated, however, that while the adhesive 30 has been described as a chemically adhesive material, the adhesive 30 may also be mechanical fastening devices such as screws, bolts, rivets, clips, and the like without departing from the scope or intent of the present disclosure.

In several aspects, the door edge protector 12 is a unitary extrusion having a rear wall member 32 coupled to a push rod member 34 by a coupling member 36. A pull member 38 is also coupled to the rear wall member 32 and extends to an edge covering member 40. In several aspects, the rear wall member 32 is a thickened portion of the door edge protector 12 having increased stiffness as compared to the pull member 38, the push rod member 34 and the coupling member 36. The edge covering member 40 further includes a flexible joint 39. The flexible joint 39 provides the edge covering member 40 with a range of motion that allows the edge covering member 40 to be retracted from the trailing edge 14 of the front door 16, thereby ensuring that the exterior design of the motor vehicle 10 is uninterrupted by the edge covering member 40 when the front door 16 is closed. In some aspects, the flexible joint 39 is an end portion of the door edge protector 12, including the edge covering member 40, to which no adhesive 30 is attached.

The pull member 38 is more accurately described as having a first portion 38' and a second portion 38". The first portion 38' extends from the rear wall member 32 to a contact portion 41, and the second portion 38" extends from the contact portion 41 to the edge covering member 40. The rear wall member 32 extends from a base portion 42 secured to the front door 16 by the adhesive 30. The base portion 42 includes an extension 46 optimized to conform to contours of the interior surface 28 of the front door 16. The extension 46 increases the surface area over which the adhesive 30 is applied, thereby aiding in stabilization and long-term attachment of the door edge protector 12 to the interior surface 28 of the front door 16. In some aspects, the rear wall member 32 and the base portion 42 extend for differing distances along the interior surface 28 of the front door 16. However, it should be understood that because of the unitary construction of the door edge protector 12, the rear wall member 32 and the base portion 42 may, in some examples, and in some applications, be identical. That is, in some examples, the rear wall member 32 is also the base portion 42.

Figure 4:
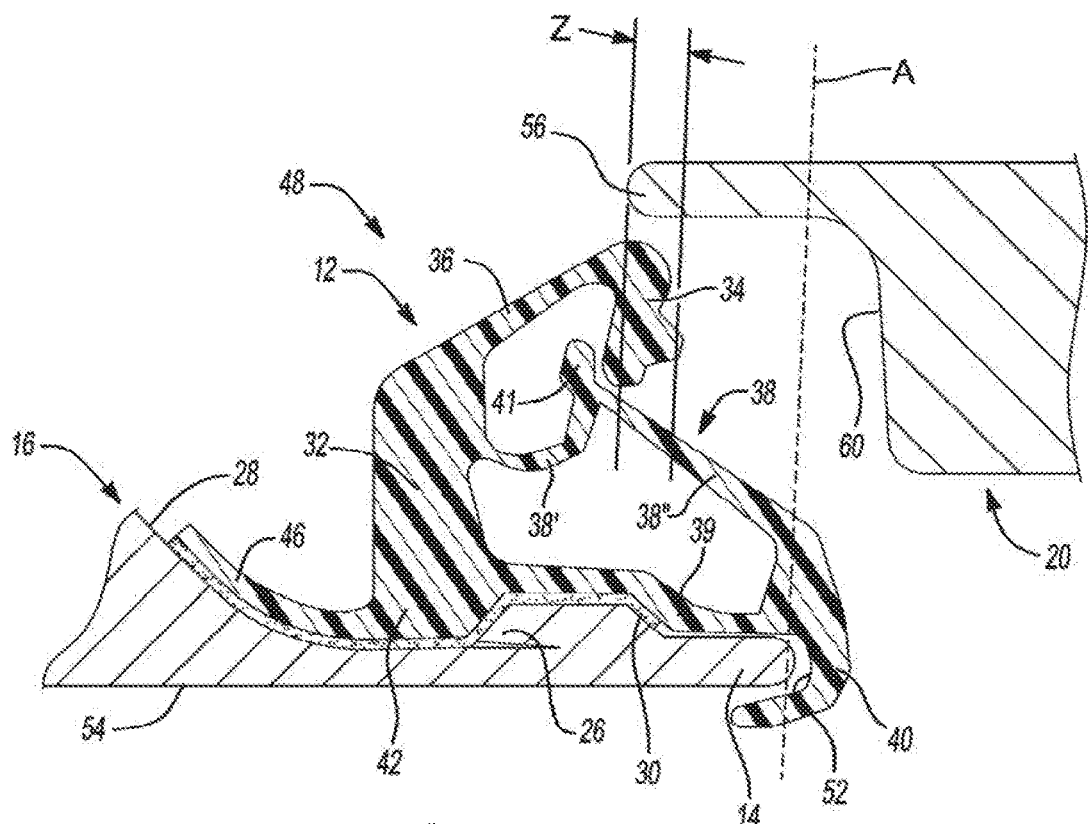
FIG. 4 is a cross sectional view of a door edge protector in a first expanded state and equipped to a door of a vehicle according to an aspect of the present disclosure.
Figure 5:
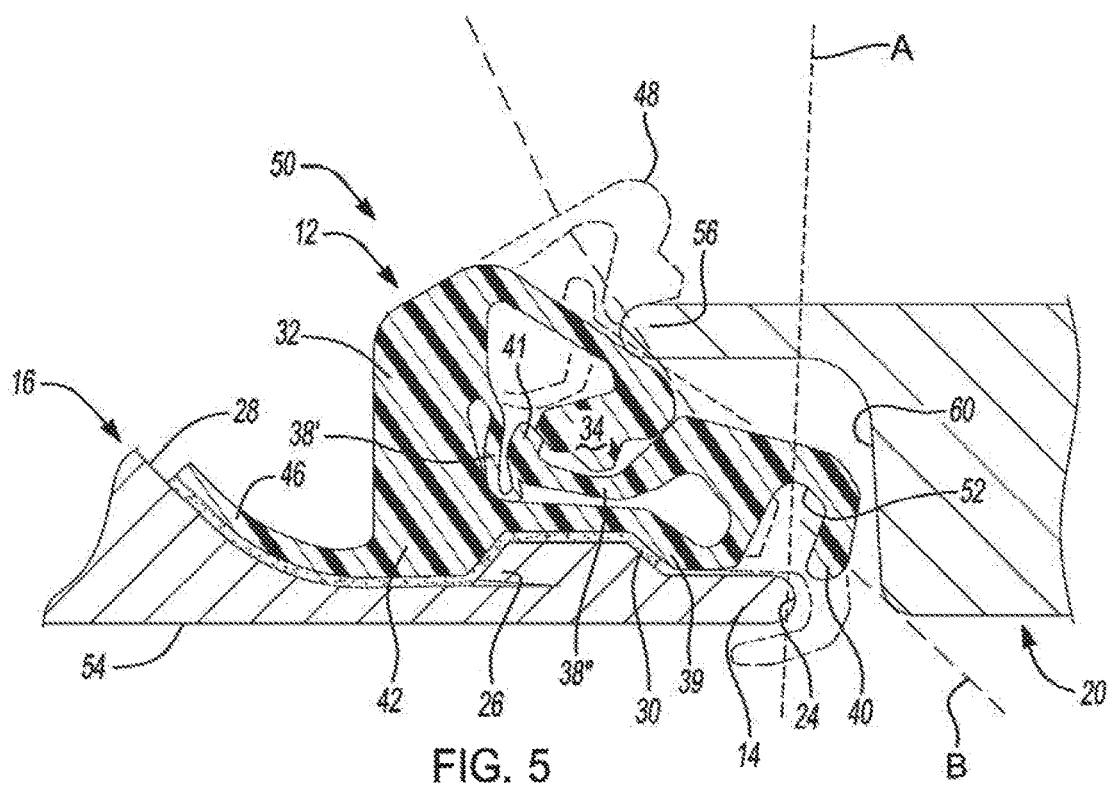
FIG. 5 is a cross sectional view of a door edge protector in a first compressed state and equipped to a door of a vehicle according to an aspect of the present disclosure.

Referring now to FIGS. 4-5, and with continuing reference to FIGS. 1-3, the door edge protector 12 has a first deployed position 48 shown specifically in FIGS. 3 and 4, and a first undeployed position 50 shown in FIG. 5. In the examples of FIGS. 4-5, the front door 16 moves relative to the rear door 20. When the front door 16 of the motor vehicle 10 is open, the resilient material of the door edge protector 12 expands to an uncompressed state. In the uncompressed state, the edge covering member 40 extends out and around the trailing edge 14 of the front door 16 of the motor vehicle 10. In some aspects, the edge covering member 40 includes a channel 52 shaped to accept the trailing edge 14 of the front door 16. In other aspects, the edge covering member 40 extends substantially beyond the trailing edge 14 of the front door 16, protruding laterally outwardly from the outer surface 54 of the front door 16. Additionally, when in the deployed position 48, the coupling member 36 relaxes and allows the push rod member 34 to extend substantially laterally inwardly from the interior surface 28 of the front door 16.

As the front door 16 of the motor vehicle 10 is closed, the trailing edge 14 of the front door 16 travels in a substantially linear motion as indicated by line "A". As the trailing edge 14 of the front door 16 approaches the rear door 20, the push rod member 34 contacts a contact zone "Z" of the leading edge 56 of the rear door 20. As the front door 16 continues to approach the rear door 20 along line "A", the push rod member 34 contacts the pull member 38 at the contact portion 41 thereby bending the first portion 38' of the pull member 38 and reducing the distance between the pull member contact portion 41 and the interior surface 28 of the front door 16. That is, the contact portion 41 is pressed toward the interior surface 28 of the front door 16 by the push rod member 34. As the contact portion 41 is pressed toward the interior surface 28 of the front door 16, the first portion 38' is limited in range of motion by the stiffness of the rear wall member 32, and by the relatively high flexibility of the first portion 38'. Thus, the first portion 38' bends substantially. As the first portion 38' bends, the second portion 38", which is generally somewhat stiffer than the first portion 38', is pulled towards the rear wall member 32, thereby causing the edge covering member 40 to cantilever or rotate inwardly at the flexible joint 39 and towards the rear wall member 32, and generally toward the front of the motor vehicle 10. Thus, in one example, as the front door 16 is closed, the push rod member 34 mechanically interacts with the pull member 38 to retract the edge covering member 40 such that the edge covering member 40 does not protrude outwardly from the outer surface 54 of the front door 16 between the front door 16 and the rear door 20. In the above example, once the front door 16 is completely closed, the door edge protector 12 is compressed into the undeployed position 50 shown in FIG. 5.

Figure 6:
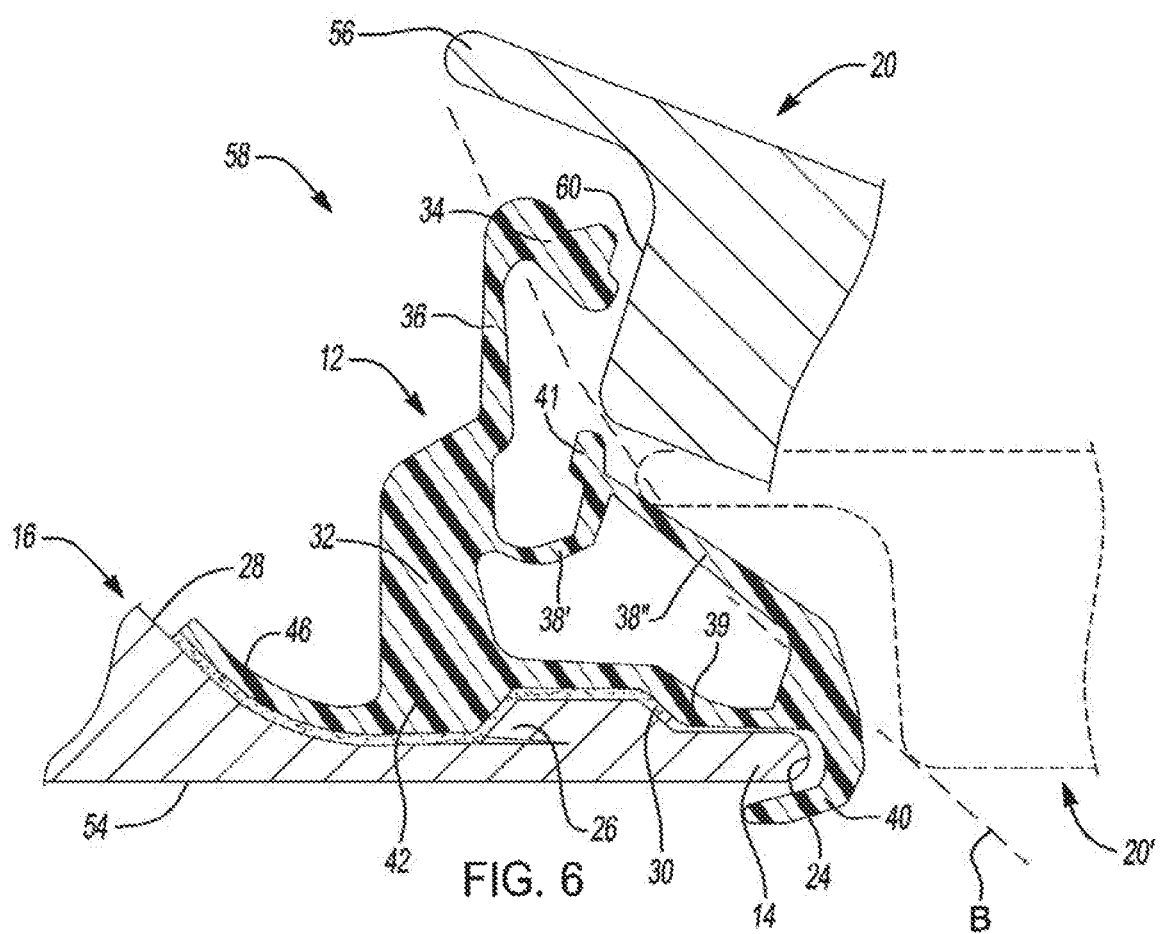
FIG. 6 is a cross sectional view of a door edge protector in a second expanded state and equipped to a door of a vehicle according to an aspect of the present disclosure.

Turning now to FIG. 6, and with continuing reference to FIGS. 1-5, a second deployed position 58 of the door edge protector 12 is shown. In the example of FIG. 6, the rear door 20 is moved relative to a closed front door 16. The rear door 20 generally moves along arc "B" as the rear door 20 is opened. For ease of understanding, in FIG. 6, a closed position of the rear door 20 is indicated numerically by reference number 20'. As the rear door 20 moves along the "B", compression between the contact zone "Z" of the leading edge 56 of the rear door 20 is released, thereby allowing the door edge protector 12 to expand to the second deployed position 58. In the second deployed position 58, the rear wall member 32, the pull member 38, and the edge covering member 40 interact in much the same way as in FIGS. 3-5, thereby causing the edge covering member 40 to extend out and around the trailing edge 14 of the front door 16. However, because the movement of the rear door 20 is in a different direction to the one indicated by line "A" in FIGS. 4 and 5, the push rod member 34 is contacted by a leading surface 60 of the rear door 20. As the rear door 20 is opened, the leading surface 60 of the rear door 20 causes the push rod member 34 to extend beyond the uncompressed position, stretching the push rod member 34 inwardly from the interior surface 28 of the front door 16. Thus, the push rod member 34 is effectively decoupled from the pull member 38 and the edge covering member 40 when the rear door 20 is opened while the front door 16 remains closed.

Figure 7:
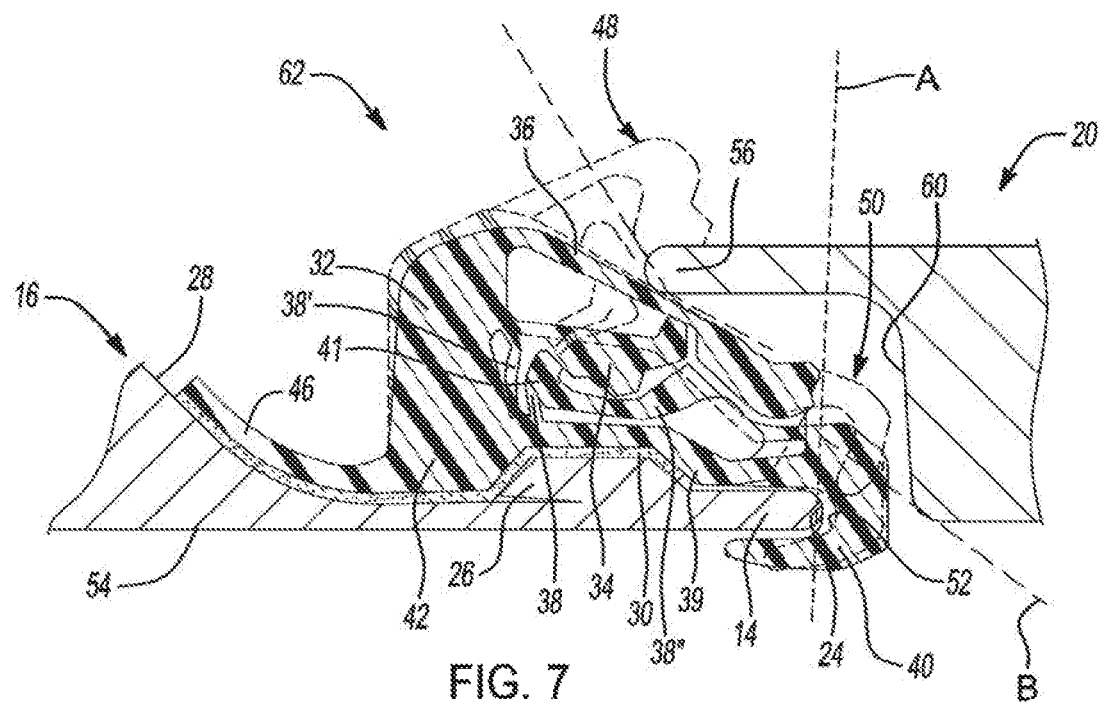
FIG. 7 is a cross sectional view of a door edge protector in a second compressed state and equipped to a door of a vehicle according to an aspect of the present disclosure.

Turning now to FIG. 7, and with continuing reference to FIGS. 1-6, a second undeployed position 62 is shown. In the FIG. 7, both the front door 16 and the rear door 20 have been maneuvered along their respective lines of travel, "A" and "B". It should be appreciated that the example of FIG. 7 is extreme, in that both the front and rear doors 16, 20 of the motor vehicle 10 have been moved in such a way that the door edge protector 12 has been at least partially captured and collapsed between the trailing edge 14 of the front door 16 and the leading edge 56 of the rear door 20. That is, in the first undeployed position 50 shown in FIG. 5, the rear wall member 32 remains substantially stationary, thereby limiting the range of motion of push rod member 34 as it contacts the contact portion 41 of the pull member 38, thereby causing the first and second portions 38', 38" of the pull member 38 to retract the edge covering member 40. However, in some examples, the rear wall member 32 moves. Thus, in the examples, as the resilient material composing the door edge protector 12 ages, or due to sudden movements of the front and rear doors 16, 20 relative to one another, or due to objects being captured between the front and rear doors 16, 20, as the front and rear doors 16, 20 are closed, the edge covering member 40 remains outside the outer surface 54 of the front door 16. In the example of FIG. 7, the rear wall member 32 moves or tilts slightly towards the trailing edge 14 of the front door 16, thereby effectively changing the length of the push rod member 34 as well as the pull member 38. The push rod member 34 then contacts the pull member 38 in a way that does not cause the edge covering member 40 to retract as the front door 16, the rear door 20, or both front and rear doors 16, 20 are closed. Thus, even in an extreme example in which the door edge protector 12 has become fatigued or is manipulated beyond optimal operating parameters, the door edge protector 12 continues to protect the trailing edge 14 of the front door 16.

A door edge protector 12 of the present disclosure offers several advantages. These include low cost, ease of manufacture, ease of assembly, durability, longevity, and resilience. Additionally, the door edge protector 12 of the present disclosure can be applied to preexisting vehicles, those vehicles currently in production, as well as future vehicles.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A door edge protector for an edge of a door of a motor vehicle, the door edge protector comprising:
    a unitary extrusion comprising a resilient flexible material having a rear wall member and a push rod member, the push rod member having a distal end and a proximal end, the proximal end coupled to the rear wall member by a coupling member, the unitary extrusion further comprising a pull member coupled to the rear wall member and extending to an edge covering member; the distal end coupled to the remainder of the unitary extrusion only by way of the proximal end and
    an adhesive attaching the unitary extrusion to an interior surface of the door of the motor vehicle,
    wherein in a first position of the push rod member, the push rod member is not in contact with the pull member and the edge covering member extends around the edge of the door;
    and wherein in a second position of the push rod member, the push rod member is in contact with the pull member and compresses a portion of the pull member, thereby retracting the edge covering member such that the edge covering member does not extend around the edge of the door.

2. The door edge protector of claim 1 wherein the rear wall member comprises an area having increased rigidity relative to each of the push rod member, the coupling member, the pull member, and the edge covering member.

3. The door edge protector of claim 1 wherein the adhesive is an adhesive foil material.

4. The door edge protector of claim 1 wherein the push rod member extends from the rear wall member away from the interior surface of the door of the motor vehicle.

5. The door edge protector of claim 1 wherein the pull member has a first effective length in the first position of the push rod member and a second effective length in the second position of the push rod member, wherein the second effective length is less than the first effective length.

6. The door edge protector of claim 5 wherein in the second position of the push rod member, the pull member decreases a distance between the rear wall member and the edge covering member.

7. The door edge protector of claim 6 wherein the pull member includes a first portion connected to a second portion.

8. The door edge protector of claim 7 wherein the first portion is more flexible than the second portion.

9. A door edge protector for an edge of a door of a motor vehicle, the door edge protector comprising:
    a unitary extrusion comprising a resilient flexible material and having a push rod member, a base portion and a rear wall member extending from the base portion, the rear wall member coupled to a proximal end of the push rod member by a coupling member, the unitary extrusion further comprising a pull member having a first portion coupled to the rear wall member and having a contact portion, the pull member having a second portion extending from the contact portion to an edge covering member the push rod member having a distal end coupled to the remainder of the unitary extrusion only by way of the proximal end; and
    an adhesive attaching the unitary extrusion to an interior surface of the door of the motor vehicle,
    wherein in a first position of the push rod member, the push rod member is not in contact with the pull member and the edge covering member extends around the edge of the door;
    and wherein in a second position of the push rod member, the push rod member is in contact with the pull member and compresses the pull member, thereby retracting the edge covering member such that the edge covering member does not extend around the edge of the door.

10. The door edge protector of claim 9 wherein in the second position of the push rod member, the push rod member contacts the pull member at the contact portion.

11. The door edge protector of claim 9 wherein the resilient material comprises at least one of a rubber, silicone, foam, or malleable plastic material.

12. The door edge protector of claim 9 wherein the rear wall member is stiffer than the push rod member and stiffer than the pull member.

13. The door edge protector of claim 9 wherein the base portion further comprises an extension, and wherein the extension is adhered to the door of the motor vehicle by the adhesive.

14. The door edge protector of claim 9 wherein the second portion of the pull member is stiffer than the first portion of the pull member.

15. The door edge protector of claim 14 wherein the edge covering member further includes a flexible joint, wherein the flexible joint is extended in the first position of the push rod member, and wherein the flexible joint is bent in the second position of the push rod member.

16. The door edge protector of claim 15 wherein in the second position of the push rod member, the push rod member at least partially compresses the contact portion, the contact portion moves toward the rear wall member, and the first portion of the pull member is compressed which pulls the second portion of the pull member toward the rear wall member thereby retracting the edge covering member.

17. The door edge protector of claim 15 wherein the adhesive is not applied along a section of the door edge protector from the flexible joint to the edge covering member.

18. A door edge protector for an edge of a door of a motor vehicle, the door edge protector comprising:

a unitary extrusion comprising a resilient flexible material and having a push rod member, a base portion and a rear wall member extending from the base portion, the rear wall member coupled to a proximal end of the push rod member by a coupling member, the unitary extrusion further comprising a pull member having a first portion coupled to the rear wall member and having a contact portion, the pull member having a second portion stiffer than the first portion, and the second portion extending from the contact portion to an edge covering member the push rod member having a distal end coupled to the remainder of the unitary extrusion only by way of the proximal end;

a flexible joint between the rear wall member and the edge covering member; and an adhesive attaching the unitary extrusion to an interior surface of the door of the motor vehicle, the adhesive not applied to the edge covering member, wherein in a first position of the push rod member, the push rod member is not in contact with the pull member and the edge covering member extends around the edge of the door, and wherein in a second position of the push rod member, the push rod member is in contact with the contact portion of the pull member and at least partially compresses the contact portion, the contact portion moves toward the rear wall member, the first portion of the pull member is compressed which pulls the second portion of the pull member toward the rear wall member thereby rotating the edge covering member at the flexible joint retracting the edge covering member.

* * * * *